US008520664B2

(12) United States Patent
Betti et al.

(10) Patent No.: US 8,520,664 B2
(45) Date of Patent: Aug. 27, 2013

(54) MULTI-VENDOR IMS ARCHITECTURE (75) Inventors: Alessandro Betti, Rome (IT);
Alessandro Di Pasquali, Rome (IT)

(73) Assignee: Tim Italia S.p.A., Milan (IT)

( * ) Notice: Subject to any disclaimer, the term of this patent is extended or adjusted under 35 U.S.C. 154(b) by 382 days.

(21) Appl. No.: 12/086,853

(22) PCT Filed: Dec. 22, 2005

(86) PCT No.: PCT/EP2005/013882
§ 371 (c)(1),
(2), (4) Date: May 19, 2010

(87) PCT Pub. No.: WO2007/071276
PCT Pub. Date: Jun. 28, 2007

(65) Prior Publication Data
US 2010/0226361 A1 Sep. 9, 2010

(51) Int. Cl.
*H04L 12/66* (2006.01)
(52) U.S. Cl.
USPC .......................................................... 370/352
(58) Field of Classification Search
USPC ................. 709/245, 226; 370/282, 400, 352, 370/252, 395.3; 455/456.4, 456.3; 705/39; 707/706; 710/3
See application file for complete search history.

(56) References Cited

U.S. PATENT DOCUMENTS

| 7,783,618 | B2 * | 8/2010 | Ayers et al. ..................... 707/706 |
| 7,844,745 | B1 * | 11/2010 | Darbyshire et al. ............... 710/3 |
| 7,961,714 | B1 * | 6/2011 | Watson et al. ................. 370/352 |
| 2002/0147845 | A1 * | 10/2002 | Sanchez-Herrero et al. . 709/245 |
| 2004/0043776 | A1 * | 3/2004 | Tuomela et al. ............ 455/456.3 |
| 2005/0226174 | A1 * | 10/2005 | Kiss .............................. 370/282 |
| 2005/0249219 | A1 * | 11/2005 | Bajko et al. ................. 370/395.3 |
| 2005/0266859 | A1 * | 12/2005 | Tejani et al. ................ 455/456.4 |
| 2005/0276229 | A1 * | 12/2005 | Torabi ............................ 370/252 |
| 2006/0067338 | A1 * | 3/2006 | Hua et al. ....................... 370/400 |
| 2008/0195535 | A1 * | 8/2008 | Liu ................................. 705/39 |
| 2008/0212569 | A1 * | 9/2008 | Terrill et al. ................... 370/352 |
| 2008/0215736 | A1 * | 9/2008 | Astrom et al. ................. 709/226 |

FOREIGN PATENT DOCUMENTS

EP 1 583 312 A1 10/2005
KR 549505 B1 * 6/2005

OTHER PUBLICATIONS

P. Calhoun et al., Diameter Base Protocol, Sep. 2003, Network Working Group.*
3rd Generation Partnership Project; Technical Specification Group Services and Systems Aspects; "Network architecture", (Release 6), 3GPP TS 23.002 V6.9.0, pp. 1-60, (2005).

(Continued)

*Primary Examiner* — Asad Nawaz
*Assistant Examiner* — Parth Patel
(74) *Attorney, Agent, or Firm* — Finnegan, Henderson, Farabow, Garrett & Dunner, L.L.P.

(57) ABSTRACT

In an internet protocol multimedia subsystem architecture including multiple home subscriber servers, an apparatus (home subscriber server proxy) is interposed between a call session controlling function and/or an application server and the multiple home subscriber servers for adapting signaling messages exchanged between the call session controlling function (and/or the application server) and the home subscriber servers, so as to overcome interoperability issues. Such apparatus can be exploited for correctly routing the signaling messages toward the home subscriber server, thus rendering unnecessary the presence of a service locator function in a multi home subscriber server internet protocol multimedia subscription architecture.

20 Claims, 5 Drawing Sheets

(56) References Cited

OTHER PUBLICATIONS

3rd Generation Partnership Project; Technical Specification Group Services and System Aspects; "IP Multimedia Subsystem (IMS) Stage 2", (Release 5), 3GPP TS 23.228 V5.14.0, pp. 1-131, (2005).
Digital cellular telecommunications system (Phase 2+); Universal Mobile Telecommunications System (UMTS); "Sh interface based on the Diameter protocol; Protocol details", (3GPP TS 29.329 version 6.6.0 Release 6), ETSI TS 129 329, pp. 1-18, (2005).
Digital cellular telecommunications system (Phase 2+); Universal Mobile Telecommunications System (UMTS); "Cx and Dx interfaces based on the Diameter protocol; Protocol details", (3GPP TS 29.229 version 6.7.0 Release 6), ETSI TS 129 229, pp. 1-29, (2005).

* cited by examiner

MULTI-VENDOR IMS ARCHITECTURE

CROSS REFERENCE TO RELATED APPLICATION

This application is a national phase application based on PCT/EP2005/013882, filed Dec. 22, 2005, the content of which is incorporated herein by reference.

TECHNICAL FIELD OF THE INVENTION

The present invention generally relates to an IMS (IP Multimedia Subsystem) architecture. Specifically, the present invention relates to an IMS architecture in which multiple HSS (Home Subscriber Server) equipment can be located (also called "multi-HSS architecture" in the following). The present invention also relates to an IMS architecture that could be upgraded to a multi-HSS architecture.

BACKGROUND OF THE INVENTION

The IMS (IP Multimedia Subsystem) is a telecommunication architecture designed in order to provide multimedia services between mobile/fixed network users, using IP (Internet Protocol) network technology. In particular, the IMS enables the evolution from the concept of traditional circuit switched voice call over PSTNs/PLMNs (Public Switched Terrestrial Networks/Public Landline Mobile Networks) to the concept of packet switched multimedia session over IP networks. With IMS, a user will be able to establish multimedia sessions with other users and/or with applications (text, audio, video, content sharing, gaming, etc.), according to interaction logics and models controlled by the IMS architecture. To this purpose, IMS consists of several network elements that implement and support many signaling transactions (based on SIP, or Session Initiation Protocol), in order to allow the handling of the multimedia sessions experienced by the network's users.

The 3GPP ($3^{rd}$ Generation Partnership Project) has specified in different documents, called Technical Specifications (i.e. TS), the IMS architecture, identifying several functions and defining specific network elements that cooperate in order to provide such functions. In particular, TS 23.228 defines the stage-2 service description for the IMS, which includes the elements necessary to support IP multimedia services, and TS 23.002 describes functional elements of a PLMN, among which the functional elements of an IMS architecture.

Figure 1:
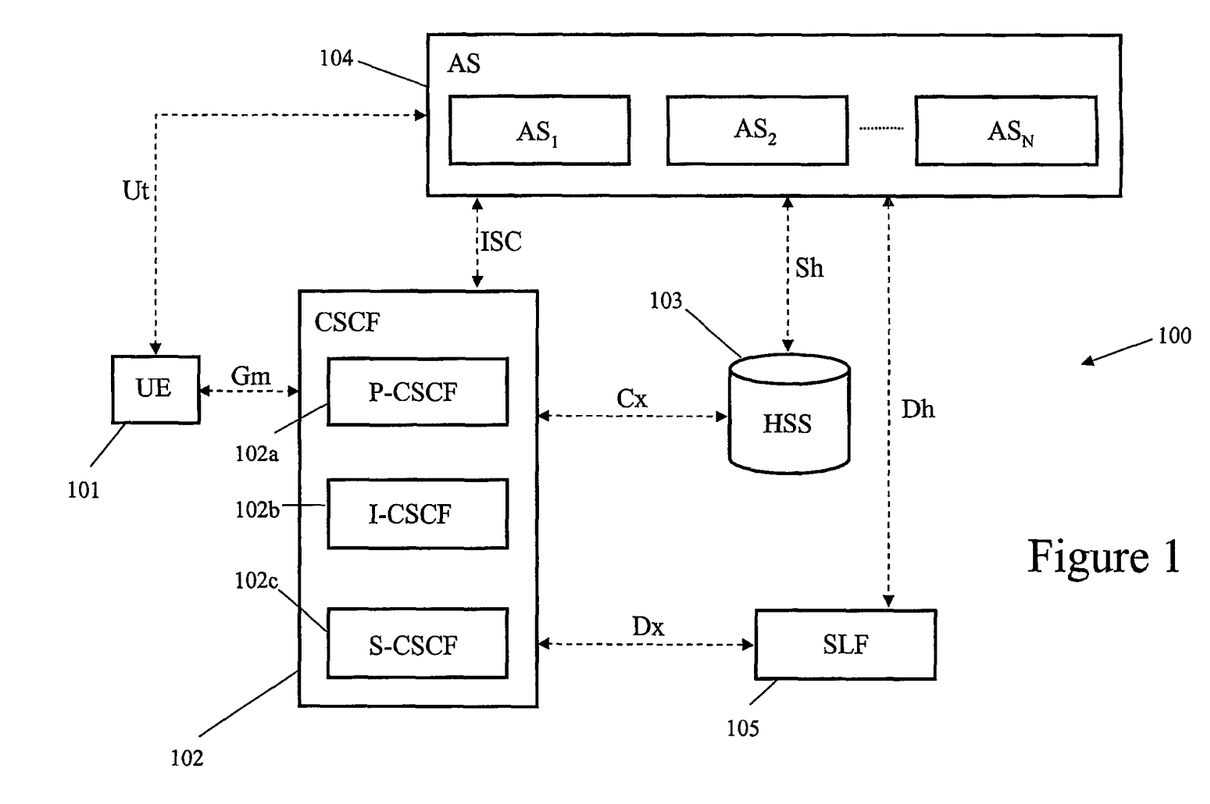
FIG. 1 schematically shows a portion of a known IMS architecture.

FIG. 1 shows a portion 100 of a known IMS architecture, as derivable from the above cited documents. The IMS architecture portion 100 of FIG. 1 comprises: a User Equipment (UE) 101; a Call Session Controlling Function (CSCF) 102, subdivided in a Proxy-CSCF (P-CSCF) 102a, an Interrogating-CSCF (I-CSCF) 102b, a Serving-CSCF (S-CSCF) 102c; a Home Subscriber Server (HSS) 103; an Application Server (AS) function 104, typically comprised of several application servers $AS_1, AS_2, \ldots, AS_N$; a Service Locator Function (SLF) 105.

A brief description of the functions disclosed in FIG. 1 is given in the following, as taken from TS 23.002.

HSS

The HSS is the master database for a given user. It is the entity containing the subscription-related information to support the network entities actually handling calls/sessions. A network may contain one or several HSSs: it depends on the number of mobile subscribers, on the capacity of the equipment and on the organization of the network. As an example, the HSS provides support to the call control servers in order to complete the routing/roaming procedures by solving authentication, authorization, naming/addressing resolution, location dependencies, etc.

The HSS is responsible for holding the following user related information:

User identification, numbering and addressing information;

User security information: network access control information for authentication and authorization;

User location information at inter-system level: the HSS supports the user registration, and stores inter-system location information, etc.;

User profile information.

The HSS also generates user security information for mutual authentication, communication integrity check and ciphering. Based on this information, the HSS is also responsible to support the call control and session management entities of the different subsystems of the operator's network. The HSS may integrate heterogeneous information, and enable enhanced features in the core network to be offered to the application and services domain, at the same time hiding the heterogeneity.

The HSS typically comprises the following functionalities:

IP multimedia functionality, to provide support to control functions of the IMS such as the CSCF. It is needed to enable subscriber usage of the IMS services. This IP multimedia functionality is independent of the access network used to access the IMS.

The subset of the HLR/AUC (Home Location Register/Authentication Center) functionality required by the PS (Packet Switched) domain of the network.

The subset of the HLR/AUC functionality required by the CS (Circuit Switched) domain of the network, if it is desired to enable subscriber access to the CS domain or to support roaming to legacy GSM/UMTS (Global System for Mobile communications/Universal Mobile Terrestrial System) CS domain networks.

CSCF

The CSCF can act as Proxy CSCF (P-CSCF), Serving CSCF (S-CSCF) or Interrogating CSCF (I-CSCF). The P-CSCF is the first contact point for the UE within the IMS; the S-CSCF actually handles the session states in the network; the I-CSCF is mainly the contact point within an operator's network for all IMS connections destined to a subscriber of that network operator, or a roaming subscriber currently located within that network operator's service area.

AS

An Application Server (AS) offers value added IP multimedia services and resides either in the user's home network or in a third party location. The third party could be a network or simply a stand-alone AS. The AS can communicate with the HSS.

The S-CSCF to AS interface is used to provide services residing in an AS. Two cases were identified:

Serving-CSCF to an AS in the home network.

Serving-CSCF to an AS in a trusted external network (e.g., third party or visited).

An Application Server may influence and impact the SIP session on behalf of the services supported by the operator's network. An AS may host and execute services.

SLF

The SLF:

is queried by the I-CSCF during the registration and session setup to get the name of the HSS containing the required subscriber specific data; Furthermore the SLF is also queried by the S-CSCF during the registration.

is queried by the AS to get the name of the HSS containing the required subscriber specific data;

is queried by the 3GPP AAA (Authentication, Authorization and Accounting) server to get the name of the HSS containing the required subscriber specific data.

The SLF is not required in a single HSS environment. Moreover, use of SLF is not required when AS are configured/managed to use pre-defined HSS.

FIG. 1 also shows some of the interfaces, or reference points, defined in the above standard documents, for reducing interoperability issues in case of use of equipment provided by different vendors. A brief description of the reference points disclosed in FIG. 1 is given in the following, still taken from TS 23.002.

Reference Point CSCF—UE (Gm Reference Point)

The Gm reference point supports the communication between UE and IMS, e.g. related to registration and session control. The protocol used for the Gm reference point is SIP.

Reference Point UE—AS (Ut Reference Point)

The Ut interface resides between the UE and a SIP Application Server. The Ut interface enables a user to manage information related to his services, such as creation and assignment of public service identities, management of authorization policies that are used, e.g., by Presence service, conference policy management, etc.

Reference Point CSCF—AS (ISC Reference Point)

This interface between CSCF and the AS is used to provide services for the IMS.

Reference Point HSS—CSCF (Cx Reference Point)

The Cx reference point supports information transfer between CSCF and HSS. The main procedures that require information transfer between CSCF and HSS are:

1) Procedures related to Serving CSCF assignment.
2) Procedures related to routing information retrieval from HSS to CSCF.
3) Procedures related to authorization (e.g., checking of roaming agreement).
4) Procedures related to authentication: transfer of security parameters of the subscriber between HSS and CSCF.
5) Procedures related to filter control: transfer of filter parameters of the subscriber from HSS to CSCF.

Reference Point CSCF—SLF (Dx Reference Point)

This interface between CSCF and SLF is used to retrieve the address of the HSS which holds the subscription for a given user. This interface is not required in a single HSS environment.

Reference Point HSS—AS (Sh Reference Point)

The Application Server may communicate with the HSS. The Sh interface is used for this purpose.

Reference Point AS—SLF (Dh Reference Point)

This interface between AS and SLF is used to retrieve the address of the HSS which holds the subscription for a given user. This interface is not required in a single HSS environment.

TS 23.228 comprises a section dedicated to a HSS resolution mechanism, which enables the I-CSCF, the S-CSCF and the AS to find the address of the HSS that holds the subscriber data for a given user identity when multiple and separately addressable HSSs are deployed by the network operator. When more than one independently addressable HSS is utilized by a network operator, the HSS where user information for a given subscriber is available has to be found. To get the HSS name the I-CSCF and the S-CSCF query the SLF entity. The SLF is accessed via the Dx interface or via the Dh interface.

For example, on REGISTER and on mobile terminated INVITEs, the I-CSCF queries the HSS for user's subscription specific data, e.g. the actual location or authentication parameters. This also has to be accomplished by the S-CSCF on REGISTER.

SUMMARY OF THE INVENTION

A problem tackled by the Applicant was to implement (and/or to upgrade an existing IMS architecture including a single HSS to) an IMS architecture including multiple HSS, in particular multiple HSS produced by different vendors/manufacturers.

The Applicant has verified that even if the IMS functional architecture has been defined and a consistent set of technical standards have been published, a number of exceptions to the full compliance to the standards is often declared by the IMS equipment vendors, so that the obtaining of full interoperability between equipment produced by different vendors is hardly reached. In particular, the Applicant has discovered that the interfaces from and to the HSS (particularly, the Cx and/or the Sh interface) produced by different vendors are still far from being interchangeable. Thus, communication between the HSS and a CSCF (and/or between the HSS and an AS) can be practically realized by buying both the HSS and the CSCF (and/or the AS) from the same vendor. Moreover, in case multiple HSS have to be installed (e.g. in order to accomplish with a high number of IMS users), all of them still have to be bought from the same vendor. Alternatively, different IMS domains should be defined in the operator's network, each domain being managed by a respective single-vendor HSS-CSCF(-AS) chain, each domain comprising a certain number of users (e.g., user1@domain1, user2@domain2). Both solutions are very unsatisfactory for a network operator.

The Applicant has devised a solution for the above problem, by interposing an apparatus between the CSCF(s) (and/or the AS(s)) and the HSS(s), for adapting signaling messages exchanged between the CSCF(s) (and/or the AS(s)) and the HSS(s), so as to overcome interoperability issues. The Applicant has found that such apparatus can be exploited for correctly routing the signaling messages towards multiple HSSs, thus rendering unnecessary the presence of a SLF in a multi-HSS IMS architecture.

In a first aspect, the invention relates to an IP Multimedia Subsystem comprising:

at least a first Home Subscriber Server;

at least one Call Session Controlling Function interacting with said at least a first Home Subscriber Server;

wherein:

the IP Multimedia Subsystem at least interacts with at least one Application Server;

the IP Multimedia Subsystem further comprises at least one apparatus interposed between: a) at least one among said at least one Call Session Controlling Function and said at least one Application Server, and b) said at least a first Home Subscriber Server;

the at least one apparatus is configured for performing adaptation of signaling messages directed to or coming from said at least a first Home Subscriber Server;

the at least one apparatus is further configured for allowing routing of signaling messages towards said at least a first Home Subscriber Server.

In a second aspect, the invention relates to an apparatus for use in an IP Multimedia Subsystem, the IP Multimedia Subsystem comprising at least a first Home Subscriber Server and at least one Call Session Controlling Function interacting with said at least a first Home Subscriber Server, the IP Multimedia Subsystem at least interacting with at least one Application Server, wherein:

the apparatus is adapted to be interposed between: a) at least one among said at least one Call Session Controlling Function and said at least one Application Server, and b) said at least a first Home Subscriber Server;

the apparatus is configured for performing adaptation of signaling messages directed to or coming from said at least a first Home Subscriber Server;

the apparatus is further configured for allowing routing of signaling messages towards said at least a first Home Subscriber Server.

In a third aspect, the invention relates to a method of operating an IP Multimedia Subsystem, the method comprising sending at least one signaling message from a Call Session Controlling Function of the IP Multimedia Subsystem or from an Application Server at least interacting with the IP Multimedia Subsystem to at least a first Home Subscriber Server of the IP Multimedia Subsystem; wherein, before reception of the at least one signaling message at the at least a first Home subscriber Server, the method further comprises:

intercepting said at least one signaling message;

performing adaptation of the at least one intercepted signaling message;

allowing routing of the at least one adapted signaling message towards said at least a first Home Subscriber Server based on information comprised in the at least one intercepted signaling message.

Further features and advantages of the present invention will be made apparent by the following detailed description of preferred embodiments thereof, provided merely by way of non-limitative example, in connection with the attached drawings.

DETAILED DESCRIPTION OF PREFERRED EMBODIMENTS OF THE INVENTION

Figure 2:
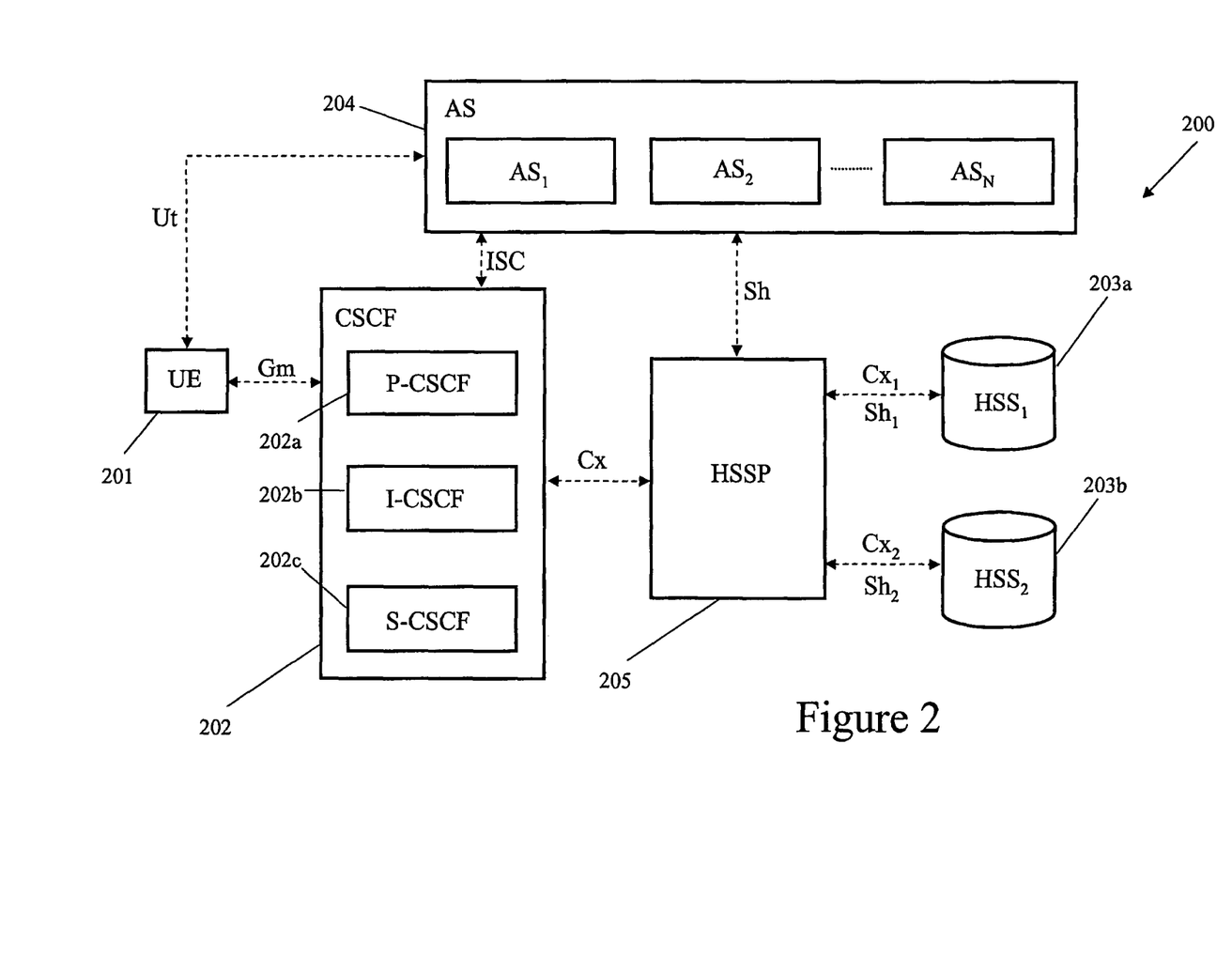
FIG. 2 schematically shows a portion of a multi-HSS IMS architecture according to one embodiment of the invention.

FIG. 2 shows a portion 200 of an IMS architecture according to one embodiment of the invention. As the skilled in the art will readily appreciate, an actual and complete IMS architecture needs more equipment, responsible for additional functionalities, not shown in FIG. 2. The portion 200 shown in FIG. 2 has been drawn in order to give an IMS architecture description sufficient for the purposes of the present invention.

The IMS architecture portion 200 of FIG. 2 comprises at least one CSCF 202 (typically comprising a P-CSCF 202a, an I-CSCF 202b, a S-CSCF 202c), at least a first $HSS_1$ 203a, at least a second $HSS_2$ 203b, an AS function 204 (typically comprising a plurality N of AS, i.e. AS, $AS_1$, $AS_2$, ..., $AS_N$). A UE 201 interacts with the IMS architecture, to enjoy services offered thereof. In particular, the $HSS_1$ 203a and the $HSS_2$ 203b are produced by different manufacturers (which, for the purposes of the present invention, it is considered to be equivalent to sold/produced by different vendors, or equivalent language). The AS function 204 at least interacts with the IMS architecture 200: in other words, the AS function (or at least one of the plurality of the ASs, $AS_1$, ..., $AS_N$) may be comprised in the IMS architecture and/or reside in a third party location and interacting with the IMS architecture.

The IMS architecture portion further comprises an apparatus 205, hereinafter referred to as a "HSS proxy", or HSSP, interposed between the CSCF 202 and the HSSs 203a, 203b. The HSS proxy 205 may also (or alternatively) be interposed between the AS 204 and the HSSs 203a, 203b.

It is remarkable that no SLF is provided in the multi-HSS IMS architecture 200 of FIG. 2.

FIG. 2 also shows a number of interfaces (or reference points) compliant with the IMS standards, between the shown equipment. A Gm interface is shown, allowing communication between the UE 201 and the CSCF 202 (typically the P-CSCF 202a). A Ut interface is shown, allowing communication between the UE and the AS 204. An ISC interface is shown, allowing communication between the CSCF 202 and the AS 204.

With regards to the Cx interface, allowing communication between the CSCF 202 and the HSSs 203a, 203b, FIG. 2 shows that such interface is interrupted at the HSSP 205, so that a Cx interface is provided by the HSSP 205 towards the CSCF 202, and a number of Cx interfaces $Cx_1$, $Cx_2$, is respectively provided by the HSSP 205 towards the HSSs 203a, 203b. In particular, the Cx interface towards the CSCF is typically interconnected with the I-CSCF 202b and/or the S-CSCF 202c. Multiple Cx interfaces can be provided by the HSSP 205 towards the CSCF, in case of use of multiple CSCF apparatus. The HSSP 205 performs adaptation of signaling messages directed to or coming from the HSSs 203a and 203b, crossing the Cx, $Cx_1$, $Cx_2$ interfaces. By "adaptation" of a signaling message it is herein intended that at least one parameter among those carried by the signaling message is changed, if needed, in order to allow correct reception (including decoding) of the signaling message to the equipment being destination of the signaling message. Specifically, the Cx interface between the CSCF 202 and the HSSP 205 allows transport of (possibly adapted) signaling messages directed to or coming from the CSCF 202; the $Cx_1$ interface between the HSSP 205 and the $HSS_1$ 203a allows transport of (possibly adapted) signaling messages directed to or coming from the $HSS_1$ 203a; the $Cx_2$ interface between the HSSP 205 and the $HSS_2$ 203b allows transport of (possibly adapted) signaling messages directed to or coming from the $HSS_2$ 203b.

With regards to the Sh interface, allowing communication between the AS 204 and the HSSs 203a, 203b, FIG. 2 shows that such interface is interrupted at the HSSP 205, so that a Sh interface is provided by the HSSP 205 towards the AS 204, and a number of Sh interfaces $Sh_1$, $Sh_2$, is respectively provided by the HSSP 205 towards the HSSs 203a, 203b. Multiple Sh interfaces can be provided by the HSSP 205 towards the AS function, in case of use of multiple ASs. In particular, it can be provided that the HSSP 205 carries a respective Sh interface for each AS, i.e. $AS_1$, $AS_2$, ... $AS_N$. The HSSP 205 performs adaptation of signaling messages directed to or coming from the HSSs 203a and 203b, crossing the Sh, $Sh_1$, $Sh_2$ interfaces. Specifically, the Sh interface between the AS 204 and the HSSP 205 allows transport of (possibly adapted) signaling messages directed to or coming from the AS 204; the $Sh_1$ interface between the HSSP 205 and the $HSS_1$ 203a allows transport of (possibly adapted) signaling messages directed to or coming from the $HSS_1$ 203a; the $Sh_2$ interface between the HSSP 205 and the $HSS_2$ 203b allows transport of (possibly adapted) signaling messages directed to or coming from the $HSS_2$ 203b.

For the sake of simplicity, single arrows have been used in FIG. 2 for schematically representing the interfaces $Cx_1$, $Sh_1$ and $Cx_2$, $Sh_2$. This does not necessarily means that the signaling messages crossing the $Cx_1$ and $Sh_1$ (or $Cx_2$ and $Sh_2$) interfaces travel on the same physical path.

In operation, the HSSP 205 receives Cx and/or Sh queries to be addressed either to the $HSS_1$ 203a or to the $HSS_2$ 203b. The HSSP 205 adapts the signaling message requests, if needed, so that they can be correctly managed by the $HSS_1$ 203a or by the $HSS_2$ 203b. Moreover, the HSSP 205 adapts the signaling messages originated by the $HSS_1$ 203a or by the $HSS_2$ 203b, so that they can be correctly managed by the CSCF 202 and/or by the AS 204. The adaptation of a signaling message request can be required by the fact that the manufacturing technologies of the CSCF 202, and/or of the AS 204, and of the specific HSS being source or destination of the signaling message request are different. Specifically, the adaptation may be required by the fact that the Cx and/or Sh interfaces realized by different vendors/manufacturers are at least partially incompatible with each other. For example, equivalent signaling messages may be structured in different way, and/or have different identifying names, etc. In such case, the HSSP 205 performs adaptation of the signaling message structure coming from the source Cx interface to the correct signaling message structure suitable for the destination Cx interface; alternatively or in combination, the HSSP 205 performs adaptation of the signaling message structure coming from the source Sh interface to the correct signaling message structure suitable for the destination Sh interface. In order to perform the adaptation, a mapping between equivalent signaling messages being manageable by the source Cx (and/or Sh) interface(s) and by the destination Cx (and/or Sh) interface(s) can be provided in the HSSP 205.

As said before, the HSSP 205 is interconnected with the CSCF 202 or the AS 204 on one side, and, on the other side, with the HSSs 203a, 203b. Practically, the HSSP 205 represents the only contact point both for CSCFs (and/or ASs) and HSSs in the IMS architecture 200. Based on that, an important benefit introduced by the HSSP 205 is the possibility to directly cope with multiple HSSs addressing issues, so that a specific SLF functionality for a User Identity to HSS resolution mechanism is no more needed. The User Identity to HSS resolution mechanism is the standard SLF functionality that, for a given user, defines the address of the HSS holding his/her corresponding subscriber data.

For the purpose of HSS address resolution, the HSSP 205 comprises a HSS Finder function, which can be practically realized by maintaining a database including the pair (subscriber identity, HSS address). By "subscriber identity" it is herein intended any valid credential (or combination of credentials) for identification, access and/or authentication within the IMS architecture 200, such as, e.g., a URI (Universal Resource Identifier), an IMSI (International Mobile Subscriber Identifier), a telephone number. By "HSS address" it is herein intended any valid address recognizable by the IMS architecture, such as, e.g., an IP address or a hostname.

The possibility of overcoming the necessity of a SLF in the IMS architecture 200, given by the HSS Finder function of the HSSP 205, is very important in a multi-vendor environment. In fact, correct routing of the signaling messages to either $HSS_1$ 203a or $HSS_2$ 203b can be guaranteed by the HSS Finder function of the HSSP 205. At the same time, the risk of possible further interoperability issues related to proprietary implementations of the SLF function itself and, particularly, of the Dx and/or Dh interfaces needed for the SLF access, is avoided. Moreover, a simplification and a reduction of the signaling traffic among different network entities (i.e. ASs, HSSs, CSCFs) can also be reached.

The position and role of the HSSP 205 in the IMS architecture 200 allow further possibilities. Preferred embodiments may provide that the HSSP 205 intercepts (i.e., at least temporarily stops) some predefined signaling messages, in order to extract information related to a presence status of the users. Such information, or a corresponding processed information thereof, can be then sent by the HSSP 205 to a Presence Server (not shown in FIG. 2) of the IMS architecture 200, in a similar way to that used for sending signaling messages to the AS 204 (i.e., on the Sh interface), or with dedicated protocols.

A Trigger Agent function can be provided in the HSSP 205, for maintaining a list of the signaling messages (or events) to be monitored in order to gather presence information, as well as for performing interception of the signaling messages. The Trigger Agent function intercepts predefined messages (e.g. messages related to registration/de-registration, and/or authentication, and/or server assignment), on the different vendor Cx interface (e.g. $Cx_1$ or $Cx_2$ in FIG. 2) and may route these messages to a Presence Handler function of the HSSP 205, responsible for the processing of the intercepted messages in order to gather the presence status information. In this way, independently of the vendor technology serving a subscriber, at least some presence information can be collected in the Presence Handler function in a simple and transparent way to the subscriber. In particular, such presence information can be collected without any further action performed by the subscriber's terminal, with a substantial reduction of the traffic generated by the UE, which can represent a considerable problem in the radio access portion of a mobile network, for example.

The presence status information derived from the intercepted signaling messages could be stored in a Presence Information Provider function of the HSSP 205, to be rendered available to specific applications or services based on, or needing, presence information, and/or directly sent to a Presence Server by the Presence Handler function.

Figure 3:
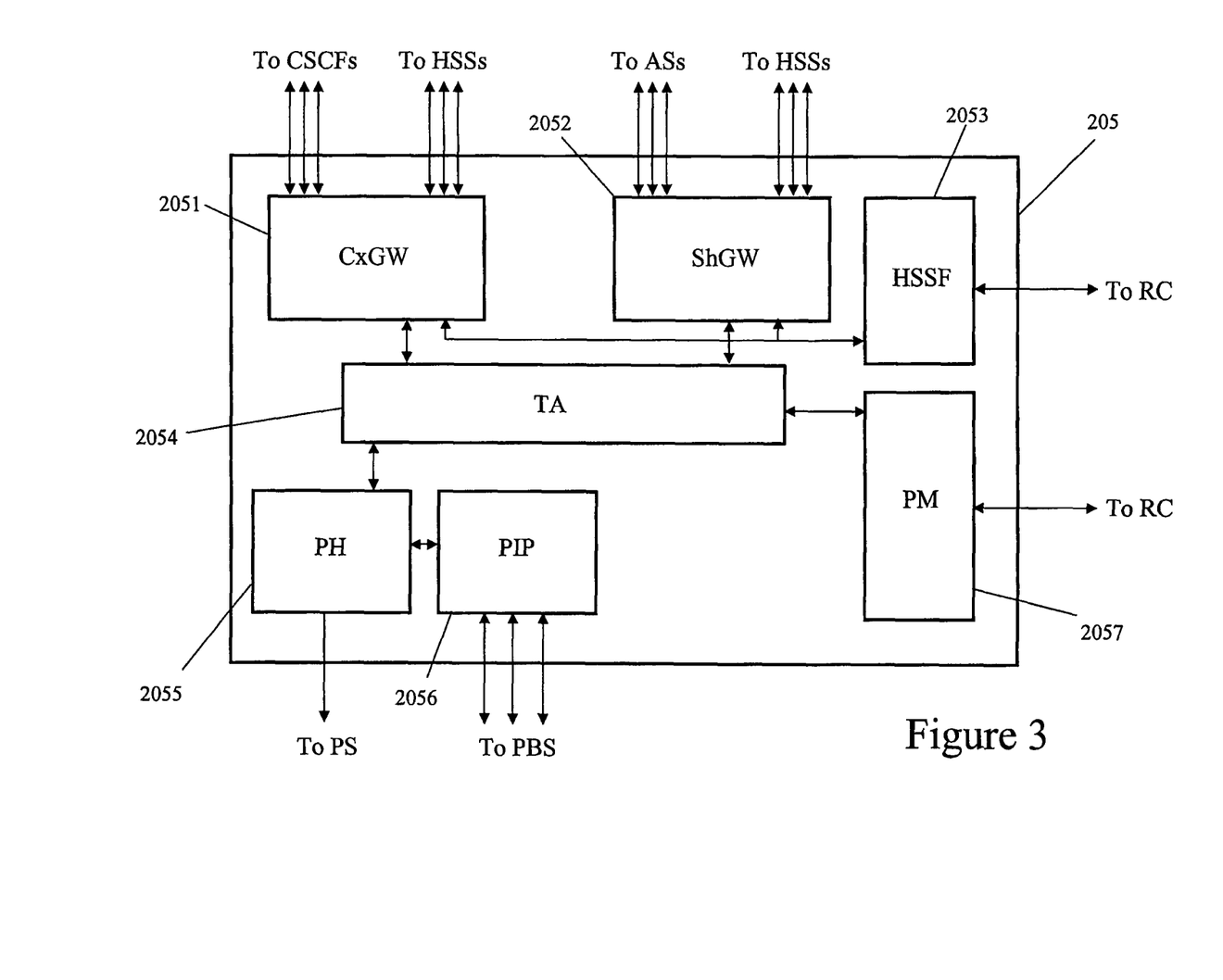
FIG. 3 schematically shows one embodiment of an apparatus to be interposed between a CSCF (and/or an AS) and multiple HSSs, in a multi-vendor IMS architecture.

FIG. 3 shows, in terms of functional blocks sufficient for the purposes of the present invention, a preferred embodiment of a HSSP 205, adapted to be used in a multi-vendor multi-HSS IMS architecture, such as the architecture 200 of FIG. 2.

HSSP 205 of FIG. 3 comprises a Cx gateway function (CxGW) 2051, interacting with the Cx interfaces of the CSCF (s), on one side, and with the Cx interfaces of the HSSs, on the other side. When needed, the CxGW function 2051 performs adaptation of Cx message structures from a source Cx interface in the correct message structure for the destination Cx interface.

HSSP 205 of FIG. 3 further comprises a Sh gateway function (ShGW) 2052, interacting with the Sh interfaces of the AS(s), on one side, and with the Sh interfaces of the HSSs, on the other side. When needed, the ShGW function 2052 performs adaptation of Sh message structures from a source Sh interface in the correct message structure for the destination Sh interface.

HSSP 205 of FIG. 3 further comprises a HSS Finder (HSSF) function 2053, interacting with the CxGW function 2051 and/or with the ShGW function 2052. When needed, the HSSF function 2053 performs user-to-HSS address resolution, so that the signaling messages can be correctly routed to the intended HSS, i.e. to the HSS containing the needed user profile information. The database used by the HSSF function 2053 can be provisioned, updated and/or controlled from a Remote Control (RC) function (not shown in FIG. 3), residing in the operator's network.

HSSP 205 of FIG. 3 further comprises a Trigger Agent (TA) function 2054, interacting with the CxGW function 2051 and/or with the ShGW function 2052. The TA function 2054 maintains a list of signaling messages to be intercepted when crossing the CxGW function 2051 and/or the ShGW function 2052, according to predefined policies. The TA function 2054 also performs interception of the predefined messages. The TA function 2054 further interacts with a Presence Handler (PH) function 2055, to which the TA function 2054 forwards predefined intercepted signaling messages for extraction of presence status information of the users related with the signaling. Intercepting policies residing in the TA function 2054 can be configured by a Policy Manager (PM) function 2057 of the HSSP 205, which interacts with the TA function 2054, and can be provisioned, updated and/or controlled from a Remote Control (RC) function (not shown in FIG. 3), residing in the operator's network.

The HSSP 205 of FIG. 3 further comprises a Presence Handler (PH) function 2055, interacting with the TA function 2054. The PH function 2055 receives signaling messages intercepted by the TA function 2054 and extracts presence status information from said intercepted messages. The extracted presence information can be forwarded to a Presence Server (PS), which is in communication with the PH function 2055. Alternatively or in combination, the extracted presence information could be stored in a Presence Information Provider (PIP) function 2056, interacting with the PH function 2055, to be rendered available for Presence Based Services (PBS) and/or applications.

Figure 4:
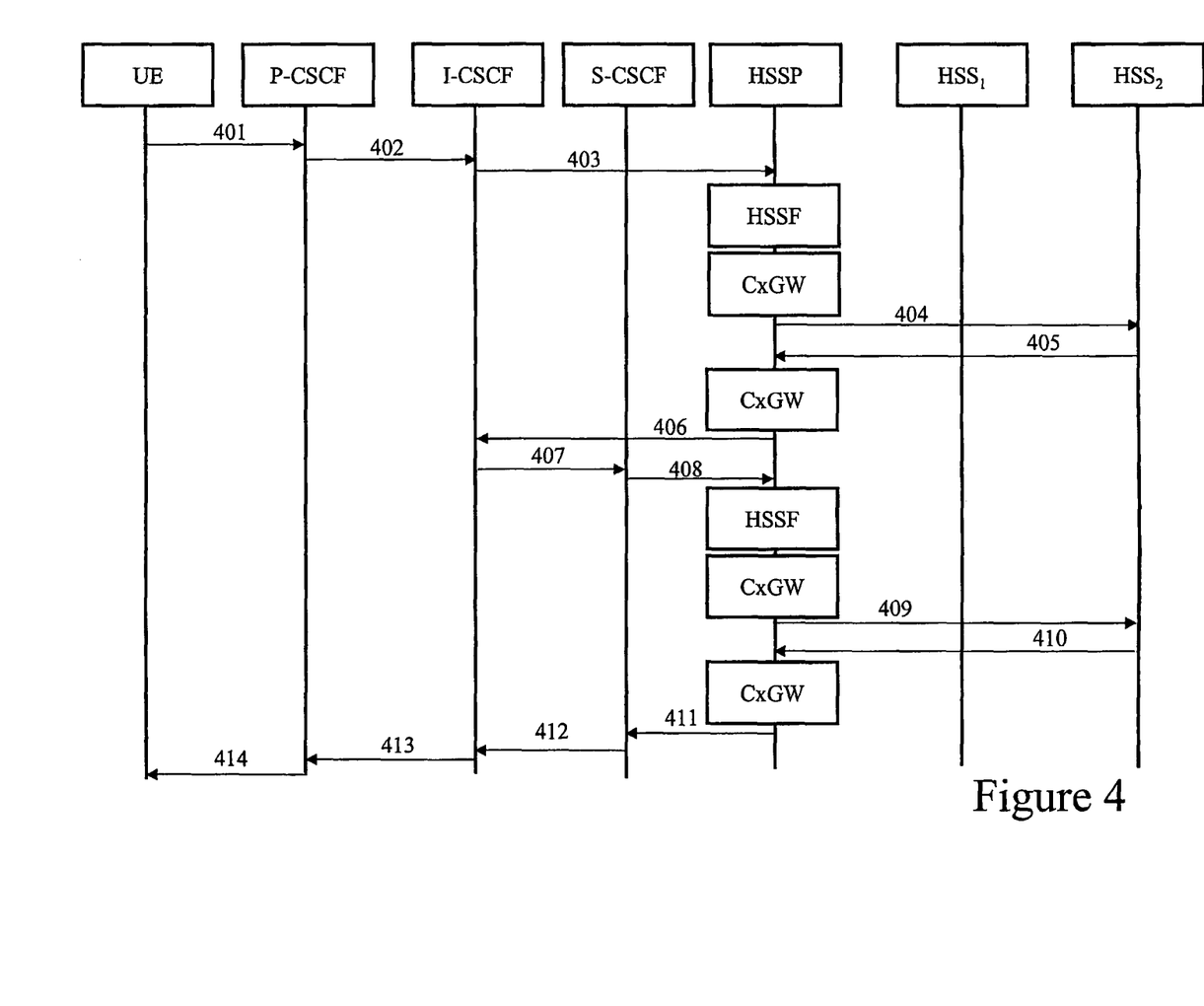
FIG. 4 shows a first exemplary flow diagram with signaling messages exchanged between equipment of the multi-HSS IMS architecture of FIG. 2.

FIG. 4 shows a first exemplary flow diagram with signaling messages exchanged between equipment residing in a multi-vendor multi HSS IMS architecture, such as the IMS architecture 200 of FIG. 2, including the HSSP 205. In particular, the flow diagram of FIG. 4 shows a possible exchange of signaling messages among a UE, a P-CSCF, an I-CSCF, a S-CSCF, the HSSP apparatus (including a HSS Finder function HSSF, and a Cx gateway function, CxGW), a first and/or a second $HSS_1$, $HSS_2$, during a registration of a user in the multi-vendor multi-HSS IMS network.

With reference to FIG. 4, after the UE has obtained IP connectivity, it can perform IMS registration. To do so, the UE sends a REGISTER information flow (401) to the P-CSCF. The REGISTER information flow comprises user identification information, such as, for example, Public User Identity, Private User Identity, home network domain name, UE IP address.

Upon receipt of the REGISTER information flow, the P-CSCF discovers the entry point to the home network (i.e. the I-CSCF), and forwards (402) the REGISTER information flow to the I-CSCF. The REGISTER information flow forwarded by the P-CSCF to the I-CSCF typically comprises at least one identifier of the P-CSCF in the network, in addition to other parameters received by the UE.

The I-CSCF sends a Cx-Query/Cx-Select-Pull information flow (403), intended to be addressed to a HSS, typically specifying the user credentials and the P-CSCF network identifier. The Cx-Query/Cx-Select-Pull information flow is instead intercepted by the CxGW function of the HSSP, which queries the HSSF function in order to determine the HSS to be contacted based on the user credentials included in the Cx-Query/Cx-Select-Pull information flow. Let's suppose that the HSS to be contacted is $HSS_2$. The Cx-Query/Cx-Select-Pull information flow is thus forwarded to $HSS_2$ (404), after possible adaptation performed by the CxGW function of the HSSP.

The $HSS_2$ checks whether the user is already registered, and/or whether the user is allowed to register in the network according to the user subscription and operator limitations/restrictions, if any. Then, the $HSS_2$ sends a Cx-Query Resp/Cx-Select-Pull Resp information flow (405), intended to be received by the I-CSCF, containing a S-CSCF name to be assigned to the UE, if known by the $HSS_2$. If the check in the $HSS_2$ was not successful, the Cx-Query Resp information flow rejects the registration attempt.

The Cx-Query Resp/Cx-Select-Pull Resp information flow is instead intercepted by the Cx GW function of the HSSP, and forwarded to the I-CSCF (406) after possible adaptation performed by the CxGW function of the HSSP.

Upon reception of the Cx-Query Resp/Cx-Select-Pull Resp information flow, the I-CSCF determine the address of the selected S-CSCF and sends the REGISTER information flow (407) to the selected S-CSCF.

Upon reception of the REGISTER information flow, the S-CSCF sends Cx-Put/Cx-Pull information flow (408), typically comprising at least one user credential and the S-CSCF name, intended to be received by a HSS. The Cx-Put/Cx-Pull information flow is instead intercepted by the (CxGW function of the) HSSP, which determines the HSS to be contacted (i.e. $HSS_2$) using its HSSF function, to which it forwards the Cx-Put/Cx-Pull information flow (409), possibly after adaptation performed by the CxGW function.

The $HSS_2$ stores the S-CSCF name as associated to that user for the session and returns a Cx-Put Resp/Cx-Pull Resp information flow (410) to the S-CSCF. The Cx-Put Resp/Cx-Pull Resp information flow is intercepted by the (CxGW function of the) HSSP, which forwards the same (411) to the S-CSCF possibly after adaptation performed by the CxGW function.

After reception of the Cx-Put Resp/Cx-Pull Resp information flow, the S-CSCF returns a 200 OK information flow to the I-CSCF (412), which forwards the same to the P-CCSCF (413), which forwards the same to the UE (414), thus closing the registration process.

From the example reported above, it is remarkable to notice that the HSSP plays a role of interface between the CSCF and the HSSs. On one side, the CSCF sends its signaling messages in the same way as it was directly connected with a single HSS, whereas, actually, the IMS architecture comprises more than one HSS (not necessarily being realized with the same technology, as far as the Cx interface is concerned). On the other side, each HSS sends its signaling messages in the same way as it was directly connected to a CSCF realized with same technology (as far as the Cx interface is concerned), whereas, actually, it may happen that its signaling messages can be adapted for being correctly received by a CSCF having a Cx interface being non-fully compatible with the Cx interface of the HSS originating the messages. In order to do that, the CSCF can be configured so as to "see" the HSSP apparatus as the HSS to be always contacted (in the same way as in a single-HSS IMS architecture). Analogously, each HSS can be configured so as to "see" the HSSP apparatus as the CSCF to be always contacted.

It is further noticed that no address resolution query towards a SLF function is needed in order to solve the address of the HSS to which the Cx information flows should be sent. The HSSP performs the routing towards the HSS comprising the profile of the message related user by checking in its HSSF function.

Figure 5:
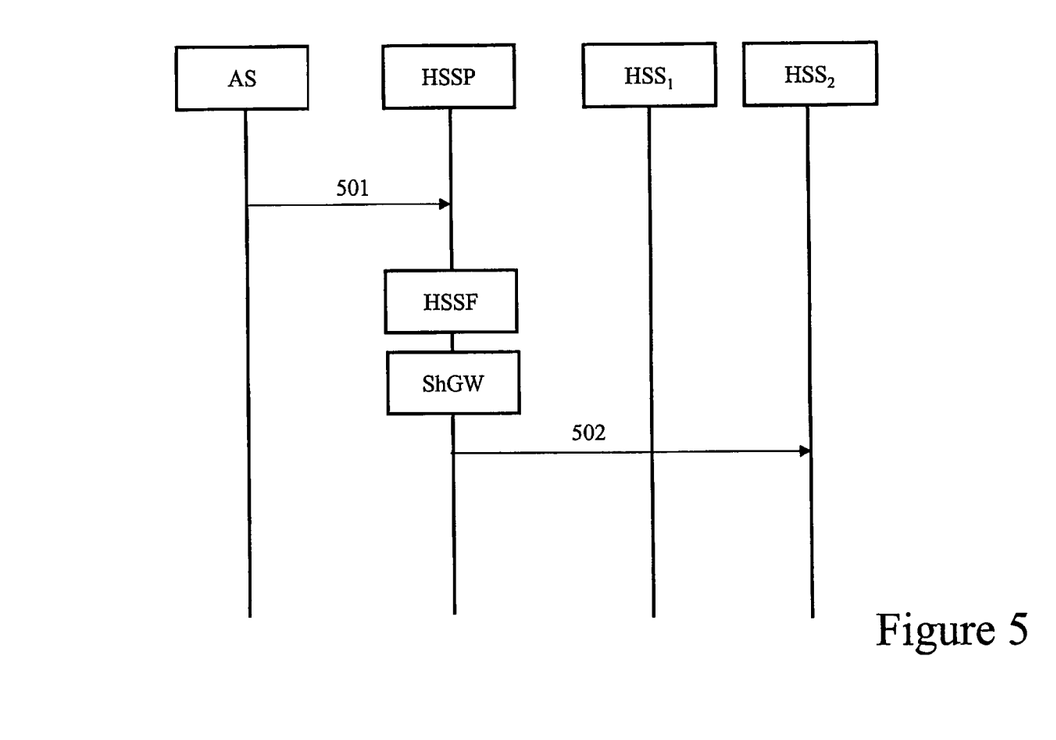
FIG. 5 shows a second exemplary flow diagram with signaling messages exchanged between equipment of the multi-HSS IMS architecture of FIG. 2.

FIG. 5 shows a second exemplary flow diagram with signaling messages exchanged between equipment residing in a multi-vendor multi HSS IMS architecture, such as the IMS architecture 200 of FIG. 2, including the HSSP 205. In particular, the flow diagram of FIG. 5 shows a possible exchange of signaling messages among an AS, the HSSP apparatus (including a HSS Finder function HSSF, and a Sh gateway function, ShGW), a first and/or a second $HSS_1$, $HSS_2$, in case of a message related to a user sent by the AS to one of the HSSs in the multi-vendor multi-HSS IMS network.

With reference to FIG. 5, the AS sends its message (501), e.g., a SH_PULL, SH_UPDATE, SH_SUBS_NOTIF message, comprising at least one user identifier. The message is intended to be addressed towards a HSS. The message is instead intercepted by the ShGW function of the HSSP, which queries the HSSF function in order to determine the HSS to be contacted based on the user credentials included in the message. Let's suppose that the HSS to be contacted is $HSS_2$. The message is thus forwarded by the HSSP to $HSS_2$ (502), after possible adaptation performed by the ShGW function.

From the example reported above, it is remarkable to notice that the HSSP plays a role of interface between the AS and the HSSs. The AS sends its signaling messages in the same way as it was directly connected with a single HSS, whereas, actually, the IMS architecture comprises more than one HSS (not necessarily being realized with the same technology, as far as the Sh interface is concerned). In order to do that, the AS can be configured so as to "see" the HSSP apparatus as the HSS to be always contacted (in the same way as in a single-HSS IMS architecture).

It is further noticed that no address resolution query towards a SLF function is needed in order to solve the address of the HSS to which the Sh information flows should be sent. The HSSP performs the routing towards the HSS comprising the profile of the message related user by checking in its HSSF function.

Other exemplary flow diagrams related to other procedures (e.g. among those reported in TS 23.228) could be easily drawn based on the teachings of the invention.

The invention produces many advantages.

A first advantage is related to the fact that the use of a HSSP function as described above enables the definition of a multi-vendor multi-HSS single IMS domain scenario even in case the actual implementations of the Cx and/or Sh interfaces comprised in the IMS equipment are not fully compatible. In other words, there is no need of implementing multiple IMS domains in case of use of multiple HSSs manufactured with different technologies.

A second advantage is related to the fact that the use of a HSSP function allows to connect third party entities (e.g. ASs), at the same time maintaining the own subscriber base distribution among multiple HSSs hidden to the third party. Actually, the third party can be even totally unaware of the multi-HSS structure of the IMS architecture. This improves the subscriber privacy and reduces the need of spreading confidential information of the operator to third parties.

A third advantage is related to the fact that the use of a HSSP function allows to connect entities produced by third parties (e.g. ASs) without the need, for the operator, of upgrading all the vendor-specific interfaces (e.g. Sh interfaces) due to a non-full compatibility with the already installed equipment. In case of connection of a non-fully compatible AS, for example, a further Sh interface could be provided in the ShGW function of the HSSP, with a further mapping between the new Sh messages and the already existing equivalent ones.

A fourth advantage is related to the fact that the use of a HSSP function allows to simplify the multi-vendor IMS architecture, in that the use of a SLF function (possibly introducing further interoperability issues due to non-full compatibility of Dx and/or Dh interfaces) can be avoided.

A fifth advantage is related to the fact that the use of a HSSP function enables traffic reduction needed for spreading presence status information within the network. In particular, traffic reduction can be obtained in the access portion of the network, since some presence information does not need to be sent by the UEs, but can be derived by interception of predefined messages performed by the HSSP. This is a great advantage, particularly in case of access by a radio interface.

Although the present invention has been disclosed and described by way of some embodiments, it is apparent to those skilled in the art that several modifications to the described embodiments, as well as other embodiments of the present invention are possible without departing from the scope thereof as defined in the appended claims.

In particular, while specific reference has been made to a multi-HSS architecture having two HSSs, it is intended that the teachings of the invention remain valid in case of use of more than two HSSs. Moreover, the teachings of the invention related to the provision of the HSSP function remain valid in case of use of a single HSS, for example because the CSCF (and/or AS) and the HSS are not fully compatible with each other, and/or because an upgrade to a multi-HSS (and, possibly, multi-vendor) IMS architecture is foreseen.

Furthermore, while specific reference has been made to a single CSCF function, it is intended that the teachings of the invention remain valid in case of use of multiple CSCF functions. In such case, a respective Cx interface could be preferably provided in the HSSP for each CSCF function.

Furthermore, while specific reference has been made to an IMS architecture according to the 3GPP standards, it is intended that the teachings of the invention remain valid also in case of use of an IMS architecture according to the 3GPP2 ($3^{rd}$ Generation Partnership Project 2, comprising North American and Asian interests developing global specifications for ANSI/TIA/EIA-41 Cellular Radiotelecommunication Intersystem Operations network evolution to 3G) standards.

Furthermore, while specific reference has been made to the presence of a single HSSP apparatus in the IMS architecture, it is intended that the teachings of the invention remain valid in case of use of a plurality of HSSP apparatus, for example provided for load balancing of the HSSP equipment and/or for redundancy purposes.

The invention claimed is:

1. An internet protocol multimedia subsystem comprising:
   at least one first home subscriber server comprising at least one hardware component;
   at least one call session controlling function for interacting with said at least one first home subscriber server;
   wherein:
   the internet protocol multimedia subsystem at least interacts with at least one application server;
   the internet protocol subsystem further comprises at least one apparatus interposed between a source and a destination respectively being one of: a) at least one among said at least one call session controlling function and said at least one application server, and b) said at least one first home subscriber server;
   the at least one apparatus is configured for performing adaptation of signaling messages coming from said source and directed to said destination by changing at least one parameter carried by said signaling messages to convert said signaling messages into equivalent signaling messages manageable by said destination; and the at least one apparatus is further configured for routing said equivalent signaling messages toward said destination, wherein the internet protocol multimedia subsystem further comprises:

a presence server function; and a configuration for:

intercepting predefined signaling messages directed to or coming from said at least one first home subscriber server;

retrieving user information from the intercepted signaling messages; and sending said retrieved user information to said presence server function.

2. The internet protocol multimedia subsystem according to claim 1, wherein the at least one apparatus is interposed between said at least one call session controlling function and said at least one first home subscriber server, and between said at least one application server and said at least one first home subscriber server.

3. The internet protocol multimedia subsystem according to claim 1, wherein the at least one apparatus is configured for performing adaptation of signaling messages coming from or directed to said at least one call session controlling function.

4. The internet protocol multimedia subsystem according to claim 1, wherein the at least one apparatus is configured for performing adaptation of signaling messages coming from or directed to said at least one application server.

5. The internet protocol multimedia subsystem according to claim 1, wherein the at least one apparatus is configured for allowing routing of said equivalent signaling messages toward said at least one first home subscriber server based on user information in said equivalent signaling messages.

6. The internet protocol multimedia subsystem according to claim 1, further comprising at least one second home subscriber server, wherein the at least one apparatus is interposed between: a) at least one among said at least one call session controlling function and said at least one application server, and b) said first and second home subscriber servers.

7. The internet protocol multimedia subsystem according to claim 6, wherein the at least one apparatus is configured for performing adaptation of signaling messages directed to or coming from the second home subscriber server.

8. The internet protocol multimedia subsystem according to claim 6, wherein the at least one apparatus is further configured for allowing routing of signaling messages toward either the first or the second home subscriber server.

9. The internet protocol subsystem according to claim 6, wherein the first home subscriber server and the second home subscriber server comprise Cx interfaces toward said at least one call session controlling function, and wherein the Cx interfaces of the first home subscriber server are at least partially incompatible with the Cx interfaces of the second home subscriber server.

10. The internet protocol multimedia subsystem according to claim 6, wherein the first home subscriber server and the second home subscriber server comprise Sh interfaces toward said at least one application server, and wherein the Sh interfaces of the first home subscriber server are at least partially incompatible with the Sh interfaces of the second home subscriber server.

11. An apparatus for use in an internet protocol multimedia subsystem, the internet protocol multimedia subsystem comprising:

at least one first home subscriber server comprising at least one hardware component; and at least one call session controlling function for interacting with said at least one first home subscriber server, the internet protocol multimedia subsystem at least interacting with at least one application server, wherein:

the apparatus is configured to be interposed between a source and a destination respectively being one of: a) at least one among said at least one call session controlling function and said at least one application server, and b) said at least one first home subscriber server;

the apparatus is configured for performing adaptation of signaling messages coming from said source and directed to said destination by changing at least one parameter carried by said signaling messages to convert said signaling messages into equivalent signaling messages manageable by said destination; and the apparatus is further configured for routing said equivalent signaling messages toward said destination, and wherein the internet protocol multimedia subsystem further comprises:

a presence server function; and a configuration for:

intercepting predefined signaling messages directed to or coming from said at least one first home subscriber server;

retrieving user information from the intercepted signaling messages; and sending said retrieved user information to said presence server function.

12. The apparatus according to claim 11, comprising a configuration adapted to be interposed between said at least one call session controlling function and said at least one first home subscriber server, and between said at least one application server and said at least one first home subscriber server.

13. The apparatus according to claim 11, comprising a configuration for performing adaptation of signaling messages coming from or directed to said at least one call session controlling function.

14. The apparatus according to claim 11, comprising a configuration for performing adaptation of signaling messages coming from or directed to said at least one application server.

15. The apparatus according to claim 11, comprising a configuration for allowing routing of said equivalent signaling messages toward said at least one first home subscriber server based on user information in said equivalent signaling messages.

16. The apparatus according to claim 11, comprising a Cx interface respectively for each home subscriber server in the internet protocol multimedia subsystem.

17. The apparatus according to claim 11, comprising an Sh interface respectively for each home subscriber server in the internet protocol multimedia subsystem.

18. The apparatus according to claim 11, comprising a Cx interface respectively for each call session controlling function in the internet protocol multimedia subsystem.

19. The apparatus according to claim 11, comprising an Sh interface respectively for each application server at least interacting with the internet protocol multimedia subsystem.

20. A method of operating an internet protocol multimedia subsystem, comprising:

sending at least one signaling message, from a call session controlling function of the internet protocol multimedia subsystem or from an application server at least interacting with the internet protocol multimedia subsystem, to at least one first home subscriber server of the internet protocol multimedia subsystem, the at least one first home subscriber server comprising at least one hardware component;

wherein, before reception of the at least one signaling message at the at least one first home subscriber server, the method further comprises:

intercepting said at least one signaling message directed to or coming from said at least one first home subscriber server;

retrieving user information from the intercepted at least one signaling message;

sending said retrieved user information to a presence server function; and performing adaptation of the at least one intercepted signaling message by changing at least one parameter carried by said at least one intercepted signaling message to convert said at least one intercepted signaling message into at least one equivalent signaling message manageable by said at least one first home subscriber server; and routing the at least one equivalent signaling message toward said at least one first home subscriber server based on information in the at least one intercepted signaling message.

* * * * *

UNITED STATES PATENT AND TRADEMARK OFFICE
CERTIFICATE OF CORRECTION

| | | |
|---|---|---|
| PATENT NO. | : 8,520,664 B2 | Page 1 of 1 |
| APPLICATION NO. | : 12/086853 | |
| DATED | : August 27, 2013 | |
| INVENTOR(S) | : Betti et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1175 days.

Signed and Sealed this
Twenty-fourth Day of March, 2015

Michelle K. Lee
*Director of the United States Patent and Trademark Office*